US 8,074,738 B2

(12) United States Patent
McDonald et al.

(10) Patent No.: US 8,074,738 B2
(45) Date of Patent: Dec. 13, 2011

(54) OFFSHORE THERMAL TREATMENT OF DRILL CUTTINGS FED FROM A BULK TRANSFER SYSTEM

(75) Inventors: Nick McDonald, Stonehaven (GB); Andrew Murray, Buckie (GB)

(73) Assignee: M-I L.L.C., Houston, TX (US)

( * ) Notice: Subject to any disclaimer, the term of this patent is extended or adjusted under 35 U.S.C. 154(b) by 712 days.

(21) Appl. No.: 11/952,047

(22) Filed: Dec. 6, 2007

(65) Prior Publication Data
US 2008/0210466 A1 Sep. 4, 2008

Related U.S. Application Data

(60) Provisional application No. 60/869,175, filed on Dec. 8, 2006, provisional application No. 60/951,845, filed on Jul. 25, 2007.

(51) Int. Cl.
*E21B 21/06* (2006.01)
(52) U.S. Cl. ............ 175/5; 175/66; 175/206; 175/207; 166/357; 210/767; 210/770
(58) Field of Classification Search ............ 166/357, 166/358; 175/5, 66, 206, 207; 210/767, 210/770, 774, 775, 787
See application file for complete search history.

(56) References Cited

U.S. PATENT DOCUMENTS

| | | | | |
|---|---|---|---|---|
| 4,595,422 A | * | 6/1986 | Hill et al. ............ | 134/19 |
| 5,127,343 A | * | 7/1992 | O'Ham ............ | 110/233 |
| 5,236,605 A | * | 8/1993 | Warncke ............ | 210/799 |
| 5,303,786 A | * | 4/1994 | Prestridge et al. ............ | 175/66 |
| 5,310,285 A | * | 5/1994 | Northcott ............ | 588/250 |
| 5,344,570 A | * | 9/1994 | McLachlan et al. ............ | 210/709 |
| 5,402,857 A | * | 4/1995 | Dietzen ............ | 175/66 |
| 5,564,509 A | * | 10/1996 | Dietzen ............ | 175/66 |
| 5,839,521 A | * | 11/1998 | Dietzen ............ | 175/66 |
| 5,842,529 A | * | 12/1998 | Dietzen ............ | 175/66 |
| 5,913,372 A | * | 6/1999 | Dietzen ............ | 175/66 |
| 5,964,304 A | * | 10/1999 | Morrison et al. ............ | 175/38 |

(Continued)

FOREIGN PATENT DOCUMENTS
WO 2006/003400 1/2006

OTHER PUBLICATIONS

PCT International Search Report issued in PCT Application No. PCT/US2007/086881 dated May 13, 2008 (3 pages).

(Continued)

*Primary Examiner* — Thomas Beach
*Assistant Examiner* — Matthew Buck
(74) *Attorney, Agent, or Firm* — Osha Liang LLP

(57) ABSTRACT

A system for offshore treatment of drill cuttings that includes a first pressurized vessel configured to receive contaminated drill cuttings and adapted to allow a compressed gas be introduced therein as the sole means for inducing movement of said contaminated drill cuttings in the first pressurized vessel, whereby at least a portion of the contaminated drill cuttings is discharged from the first pressurized vessel; and a reactor unit in fluid connection with the first pressurized vessel for separating the contaminated drill cuttings into drill cuttings and contaminants, wherein the reactor unit includes a processing chamber having at least one inlet and outlet; and a rotor mounted in the processing chamber, the rotor including a shaft; and a plurality of fixed rotor arms extending radially from the shaft is disclosed.

19 Claims, 5 Drawing Sheets

U.S. PATENT DOCUMENTS

| | | | | |
|---|---|---|---|---|
| 5,968,370 A * | 10/1999 | Trim | | 210/723 |
| 6,009,959 A * | 1/2000 | Dietzen | | 175/66 |
| 6,106,733 A * | 8/2000 | Wood | | 210/774 |
| 6,170,580 B1 * | 1/2001 | Reddoch | | 175/66 |
| 6,179,070 B1 * | 1/2001 | Dietzen | | 175/66 |
| 6,179,071 B1 * | 1/2001 | Dietzen | | 175/66 |
| 6,213,227 B1 * | 4/2001 | Dietzen | | 175/66 |
| 6,234,258 B1 * | 5/2001 | Karigan | | 175/66 |
| 6,328,118 B1 * | 12/2001 | Karigan et al. | | 175/66 |
| 6,345,672 B1 * | 2/2002 | Dietzen | | 175/66 |
| 6,391,198 B1 * | 5/2002 | Porter et al. | | 210/241 |
| 6,553,901 B2 * | 4/2003 | Reddoch | | 100/45 |
| 6,585,115 B1 * | 7/2003 | Reddoch et al. | | 209/3 |
| 6,640,912 B2 * | 11/2003 | Reddoch | | 175/217 |
| 6,658,757 B2 * | 12/2003 | Fout et al. | | 34/76 |
| 6,668,947 B2 * | 12/2003 | Cordova | | 175/66 |
| 6,695,077 B2 * | 2/2004 | Szymocha et al. | | 175/66 |
| 6,698,989 B2 * | 3/2004 | Snowdon | | 414/137.1 |
| 6,702,539 B2 * | 3/2004 | Snowdon | | 414/137.1 |
| 6,709,216 B2 * | 3/2004 | Snowdon | | 414/137.1 |
| 6,709,217 B1 * | 3/2004 | Snowdon | | 414/137.1 |
| 6,715,610 B2 * | 4/2004 | Wait et al. | | 209/10 |
| 6,745,856 B2 * | 6/2004 | Simpson et al. | | 175/66 |
| 6,763,605 B2 * | 7/2004 | Reddoch | | 34/58 |
| 6,910,411 B2 * | 6/2005 | Reddoch | | 100/37 |
| 6,936,092 B2 * | 8/2005 | Seyffert et al. | | 95/271 |
| 6,978,851 B2 * | 12/2005 | Perez-Cordova | | 175/206 |
| 6,988,567 B2 * | 1/2006 | Burnett et al. | | 175/66 |
| 7,033,124 B2 * | 4/2006 | Snowdon | | 414/137.1 |
| 7,186,062 B2 * | 3/2007 | Snowdon | | 406/121 |
| 7,195,084 B2 * | 3/2007 | Burnett et al. | | 175/66 |
| 7,484,574 B2 * | 2/2009 | Burnett et al. | | 175/66 |
| 7,490,672 B2 * | 2/2009 | Hollier | | 166/357 |
| 7,493,969 B2 * | 2/2009 | Burnett et al. | | 175/88 |
| 7,544,018 B2 * | 6/2009 | Snowdon | | 406/146 |
| 2004/0144405 A1 * | 7/2004 | Garrick et al. | | 134/25.1 |
| 2004/0149395 A1 * | 8/2004 | Strand | | 159/47.1 |
| 2005/0236015 A1 * | 10/2005 | Goel et al. | | 134/10 |
| 2006/0102390 A1 | 5/2006 | Burnett et al. | | |
| 2006/0186056 A1 * | 8/2006 | Ivan | | 210/704 |
| 2008/0210466 A1 | 9/2008 | McDonald et al. | | |

OTHER PUBLICATIONS

PCT Written Opinion issued in PCT Application No. PCT/US2007/086881 dated May 13, 2008 (5 pages).

Examination Report issued in corresponding British Patent Application No. GB0909576.1; Dated Nov. 15, 2010 (3 pages).

* cited by examiner

OFFSHORE THERMAL TREATMENT OF DRILL CUTTINGS FED FROM A BULK TRANSFER SYSTEM

CROSS-REFERENCE TO RELATED APPLICATIONS

This application, pursuant to 35 U.S.C. §119(e), claims priority to U.S. Patent Application Ser. No. 60/869,175, filed on Dec. 8, 2006, and U.S. Patent Application Ser. No. 60/951, 845, filed on Jul. 25, 2007, both of which are incorporated by reference in their entirety.

BACKGROUND OF INVENTION

1. Field of the Invention

Embodiments disclosed herein relate generally to methods and systems for the offshore thermal treatment of drill cuttings.

2. Background Art

When drilling or completing wells in earth formations, various fluids ("well fluids") are typically used in the well for a variety of reasons. Common uses for well fluids include: lubrication and cooling of drill bit cutting surfaces while drilling generally or drilling-in (i.e., drilling in a targeted petroleum bearing formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, implacing a packer fluid, abandoning the well or preparing the well for abandonment, and otherwise treating the well or the formation.

As stated above, one use of well fluids is the removal of rock particles ("cuttings") from the formation being drilled. However, because of the oil content in the recovered cuttings, particularly when the drilling fluid is oil-based or hydrocarbon-based, the cuttings are an environmentally hazardous material, making disposal a problem. That is, the oil from the drilling fluid (as well as any oil from the formation) becomes associated with or adsorbed to the surfaces of the cuttings.

A variety of methods have been proposed to remove adsorbed hydrocarbons from the cuttings. U.S. Pat. No. 5,968,370 discloses one such method which includes applying a treatment fluid to the contaminated cuttings. The treatment fluid includes water, a silicate, a nonionic surfactant, an anionic surfactant, a phosphate builder and a caustic compound. The treatment fluid is then contacted with, and preferably mixed thoroughly with, the contaminated cuttings for a time sufficient to remove the hydrocarbons from at least some of the solid particles. The treatment fluid causes the hydrocarbons to be desorbed and otherwise disassociated from the solid particles.

Furthermore, the hydrocarbons then form a separate homogenous layer from the treatment fluid and any aqueous component. The hydrocarbons are then separated from the treatment fluid and from the solid particles in a separation step, e.g., by skimming. The hydrocarbons are then recovered, and the treatment fluid is recycled by applying the treatment fluid to additional contaminated sludge. The solvent must be processed separately.

Some prior art systems use low-temperature thermal desorption as a means for removing hydrocarbons from extracted soils. Generally speaking, low-temperature thermal desorption (LTTD) is an ex-situ remedial technology that uses heat to physically separate hydrocarbons from excavated soils. Thermal desorbers are designed to heat soils to temperatures sufficient to cause hydrocarbons to volatilize and desorb (physically separate) from the soil. Typically, in prior art systems, some pre- and post-processing of the excavated soil is required when using LTTD. In particular, cuttings are first screened to remove large cuttings (e.g., cuttings that are greater than 2 inches in diameter). These cuttings may be sized (i.e., crushed or shredded) and then introduced back into a feed material. After leaving the desorber, soils are cooled, re-moistened, and stabilized (as necessary) to prepare them for disposal/reuse.

U.S. Pat. No. 5,127,343 (the '343 patent) discloses one prior art apparatus for the low-temperature thermal desorption of hydrocarbons. FIG. 1 from the '343 patent reveals that the apparatus consists of three main parts: a soil treating vessel, a bank of heaters, and a vacuum and gas discharge system. The soil treating vessel is a rectangularly shaped receptacle. The bottom wall of the soil treating vessel has a plurality of vacuum chambers, and each vacuum chamber has an elongated vacuum tube positioned inside. The vacuum tube is surrounded by pea gravel, which traps dirt particles and prevents them from entering a vacuum pump attached to the vacuum tube.

The bank of heaters has a plurality of downwardly directed infrared heaters, which are closely spaced to thoroughly heat the entire surface of soil when the heaters are on. The apparatus functions by heating the soil both radiantly and conventionally, and a vacuum is then pulled through tubes at a point furthest away from the heaters. This vacuum both draws the convection heat (formed by the excitation of the molecules from the infrared radiation) throughout the soil and reduces the vapor pressure within the treatment chamber. Lowering the vapor pressure decreases the boiling point of the hydrocarbons, causing the hydrocarbons to volatize at much lower temperatures than normal. The vacuum then removes the vapors and exhausts them through an exhaust stack, which may include a condenser or a catalytic converter.

Hammermill processes are often also used to recover hydrocarbons from a solid. In the typical hammermill process, the friction principle is used to generate sufficient energy for the oil fractions to be evaporated off. Specifically, a hammer mill with swinging rotor arms are used to finely crush all the particles, which results in the generation of heat, and allows for the evaporation of the oil in the material at a temperature lower than normal evaporation.

U.S. Patent Publication No. 2004/0149395 discloses a rotomill process, based on the hammermill technology, by which adsorbed oil may be evaporated at a temperature lower than its atmospheric boiling point. The presence of a vapor phase of a second component (typically water) allows for a substantial reduction in the partial pressure of the hydrocarbons, and thus a decrease in their boiling point.

Thermal desorption units are typically set up as fixed, land-based installation due to the off shore limitations associated with size, weight, and processing capacity. Thus, to avoid contamination by oil-coated drill cuttings, cuttings are typically transported onshore for processing.

Further complicating the treatment of drill cuttings, when a wellbore fluid brings cuttings to the surface, the mixture is typically subjected to various mechanical treatments (shakers, centrifuges, etc) to separate the cuttings from the recyclable wellbore fluid. However, the separated drill cuttings, which still possess a certain portion of oil from the wellbore fluid absorbed thereto, are in the form of a very thick heavy paste, creating difficulties in handling and transportation.

Thus, frequently, in offshore applications, the thick drill cuttings paste is slurrified with a carrier fluid, typically an oil-based fluid, to allow for ease in pumping and handling the drill cuttings paste.

Accordingly, there exists a continuing need for improvements in the offshore treatment of drill cuttings.

SUMMARY OF INVENTION

In one aspect, embodiments disclosed herein relate to a system for offshore treatment of drill cuttings that includes a first pressurized vessel configured to receive contaminated drill cuttings and adapted to allow a compressed gas be introduced therein as the sole means for inducing movement of said contaminated drill cuttings in the first pressurized vessel, whereby at least a portion of the contaminated drill cuttings is discharged from the first pressurized vessel; and a reactor unit in fluid connection with the first pressurized vessel for separating the contaminated drill cuttings into drill cuttings and contaminants, wherein the reactor unit includes a processing chamber having at least one inlet and outlet; and a rotor mounted in the processing chamber, the rotor including a shaft; and a plurality of fixed rotor arms extending radially from the shaft.

In another aspect, embodiments disclosed herein relate to a method offshore treatment of drill cuttings that includes pneumatically conveying contaminated drill cuttings into a first pressurized vessel having a lower conical section structured to achieve mass flow of the contaminated drill cuttings; transferring the contaminated drill cuttings to a reactor unit by applying a compressed gas to the pressurized vessel whereby the contaminated drill cuttings flow out of the pressurized vessel into the reactor vessel by positive pressure; applying heat to the contaminated drill cuttings so as to vaporize contaminants from the contaminated drill cuttings; and removing the vaporized contaminants from the reactor.

In yet another aspect, embodiments disclosed herein relate to a method offshore treatment of drill cuttings that includes pneumatically conveying contaminated drill cuttings into a first pressurized vessel having a lower conical section structured to achieve mass flow of the contaminated drill cuttings; transferring the contaminated drill cuttings to a separator by applying a compressed gas to the pressurized vessel whereby the contaminated drill cuttings flow out of the pressurized vessel into the reactor vessel by positive pressure; removing at least a portion of liquid content from the contaminated drill cuttings; transferring the contaminated drill cuttings to a reactor unit; applying heat to the contaminated drill cuttings so as to vaporize contaminants from the contaminated drill cuttings; and removing the vaporized contaminants from the reactor.

Other aspects and advantages of the invention will be apparent from the following description and the appended claims.

DETAILED DESCRIPTION

In one aspect, embodiments disclosed herein relate to offshore thermal treatment of drill cuttings. In particular, embodiments disclosed herein relate to systems and methods for treating drill cuttings.

Figure 1:
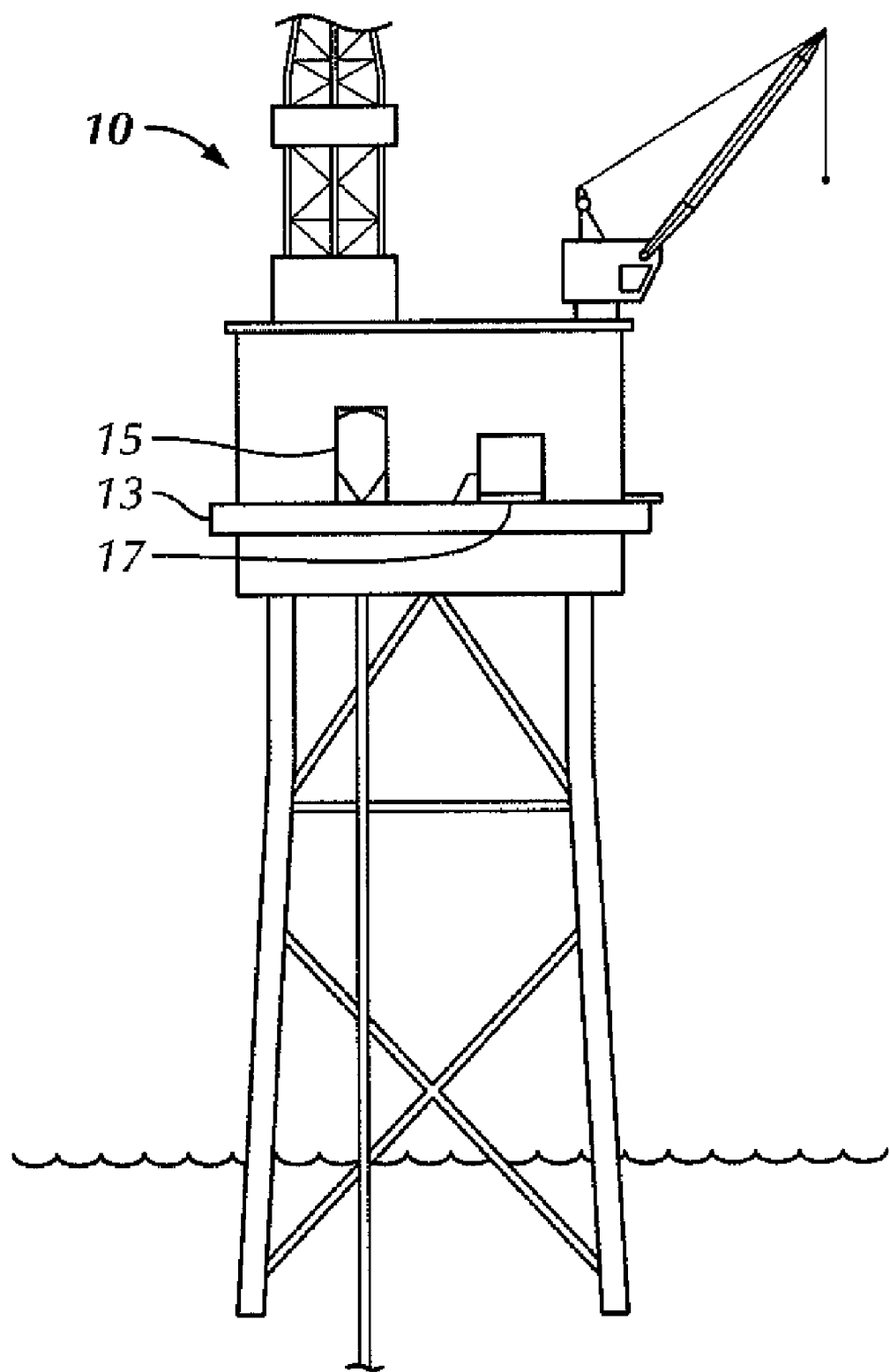
FIG. 1 is a schematic of a system according to one embodiment of the present disclosure.

Referring to FIG. 1, an offshore oil rig 10 on which the treatment of drill cuttings may be performed according to one embodiment of the present disclosure is shown. On the platform 13 of offshore oil rig 10, a pressurized vessel 15 is located. Drill cuttings, after undergoing traditional screening process, are loaded into pressurized vessel 15. From pressurized vessel 15, drill cuttings may exit the pressurized vessel 15 and be loaded into reactor unit 17. In reactor unit 17, at least a portion of the contaminants adsorbed onto the surface of drill cuttings may be removed.

Figure 2:
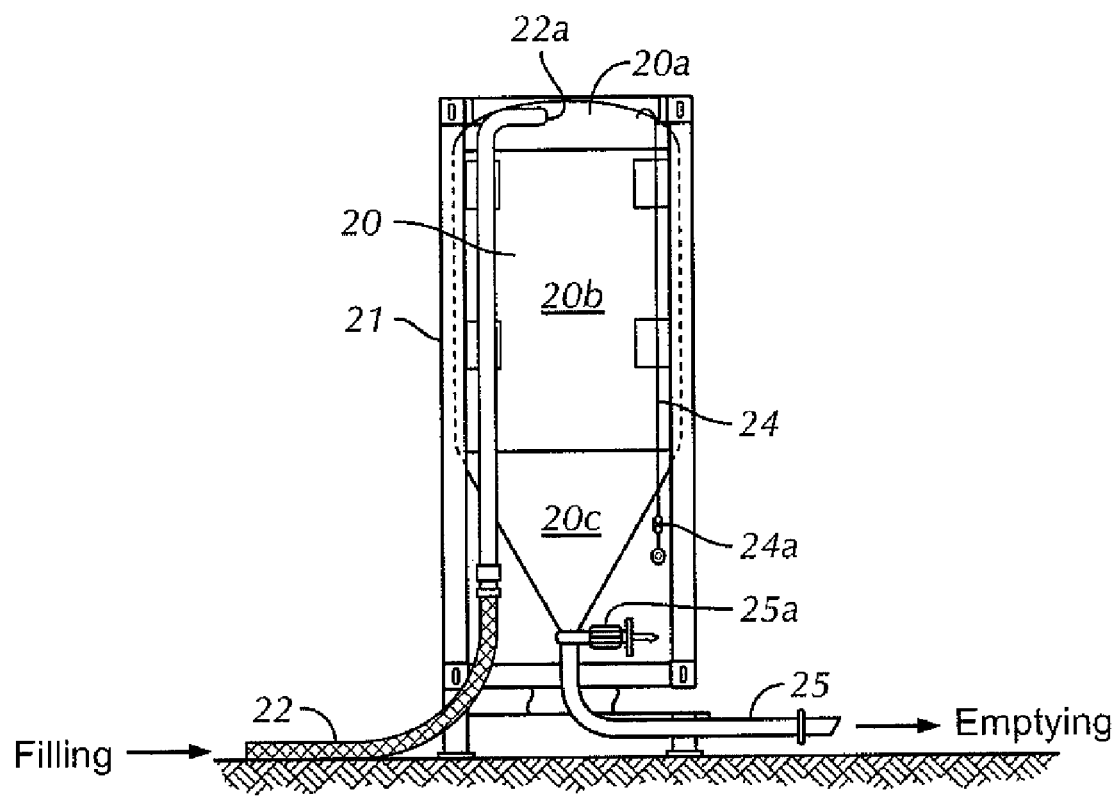
FIG. 2 is a schematic of a pressurized vessel according to one embodiment of the present disclosure.

Referring to FIG. 2, a pressurized vessel according to one embodiment of the present disclosure is shown. As shown in FIG. 2, a pressurized vessel 20 may be located within a support frame 21. Pressurized vessel 20 has a part spherical upper end 20a, a cylindrical body section 20b, and a lower angled section 20c. At the lowermost end of the angled section 20c, the vessel is provided with a discharge valve 25a having connected thereto a pipe 25. A filling pipe 22 extends into each pressurized vessel 20 via an inlet valve 22a at the upper end 20a of pressurized vessel 20. Also extending into upper end 20a of pressurized vessel 20 is a compressed air line 24 having valves 24a.

In a filling operation, prior to loading any drill cuttings into pressurized vessel 20, inlet valve 22a is closed. A vent valve (not shown) may be opened to equalize the vessel pressure to ambient air. The inlet valve 22a is opened, and the drill cuttings are fed into the pressurized vessel 20. The vent valve may be opened to vent displaced air from the vessel. When the pressurized vessel 20 is full, the inlet valve 22a and vent valve are closed, sealing the pressurized vessel. In order to empty a vessel that is filled via pipe 22, inlet valve 22a is closed, valve 25a is opened, and compressed air is fed into the vessel 20 via air line 24. The drill cuttings are forced out of vessel 20 under the pressure of the compressed air and into pipe 25. While the above embodiment refers to application of compressed air into the pressurized vessel, one of ordinary skill in the art would recognize that is within the scope of the present disclosure that other inert gases, for example, compressed nitrogen, may be used in place of compressed air. In a particular embodiment, the compressed gas applied to the pressurized vessel may be within a pressure ranging from about 4 to 8 bar.

Due to the angle of the lower angled section being less than a certain value, the material flow out of the vessel is of the type known as mass flow and results in all of the material exiting uniformly out of the vessel. In the case of mass flow, all of the drill cuttings material in the vessel descend or move in a uniform manner towards the outlet, as compared to funnel flow (a central core of material moves, with stagnant materials near the hopper walls). It is known that the critical hopper angle (to achieve mass flow) may vary depending upon the material being conveyed and/or the vessel material. In various embodiments, the angle (from the vertical axis) for mass flow to occur may be less than 40°. One of ordinary skill in the art would recognize that in various embodiments the lower angled section may be conical or otherwise generally pyramidal in shape or otherwise reducing in nature, e.g., a wedge transition or chisel, to promote mass flow. In a particular embodiment, the lower angled section has a minimum discharge dimension of at least 12 inches (300 mm). After exiting the vessel, the material is typically conveyed in the form of a semi-solid slug along pipe 25.

Figure 3:
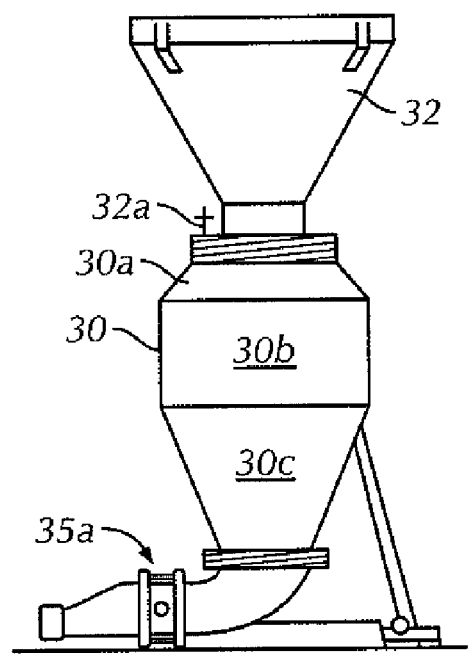
FIG. 3 is a schematic of a pressurized vessel according to another embodiment of the present disclosure.

Referring to FIG. 3, an alternative embodiment of a pressurized vessel is shown. As shown in FIG. 3, pressurized vessel 30 has an upper end 30a, a body section 30b, and a lower angled section 30c. Connected at its upper end 30a is feed hopper 32 with an inlet valve 32a therebetween. At the lowermost end of the conical section 30c, the vessel is provided with a discharge valve 35a.

In a filling operation, inlet valve 32a is opened, and the drill cuttings are fed into the pressurized vessel 30 through the feed hopper 32, which may optionally be a vibrating feed hopper. When the pressurized vessel 30 is full, the inlet valve 32a is closed, sealing the pressurized vessel. In order to empty the valve, inlet valve 32a remains closed, discharge valve 35a is opened, and compressed air is fed into the vessel 30 via air line (not shown). The drill cuttings are forced out of vessel 30 under the pressure of the compressed air and into a discharge pipe (not shown). Due to the selected angle of the lower angled section being less than a certain value, the material flow out of the vessel is of the type known as mass flow and results in all of the material exiting uniformly out of the vessel.

One of ordinary skill in the art would recognize that in alternate embodiments, any number of pressurized vessels may be used, which may be connected in series or with a common material filling pipe and a common material discharge pipe. In a particular embodiment, drill cuttings may be conveyed from shakers (or other separation means) into a pressurized vessel having a feed chute attached thereto, such as that described in FIG. 3, and then be discharged from the first pressurized vessel and conveyed into a second pressurized vessel, such as that described in FIG. 2.

Pressurized vessel 20 may be filled with drill cuttings by various means. In one embodiment, filling pipe 22 and thus inlet valve 22a, which empty drill cuttings into pressurized vessel 20, may be supplied with drill cuttings for processing by vacuum assistance. For example, a vacuum collection system, as described in U.S. Pat. Nos. 5,402,857, 5,564,509, and 6,213,227, which are assigned to the present assignee and incorporated herein by reference in there entirety, may be used to deliver drill cuttings from a cuttings trough to the pressurized vessel of the present disclosure. In another embodiment, cuttings may be fed directly from a shaker and/or cuttings trough to a pressurized vessel, such as through a feed hopper, as shown in FIG. 3.

Figure 4:
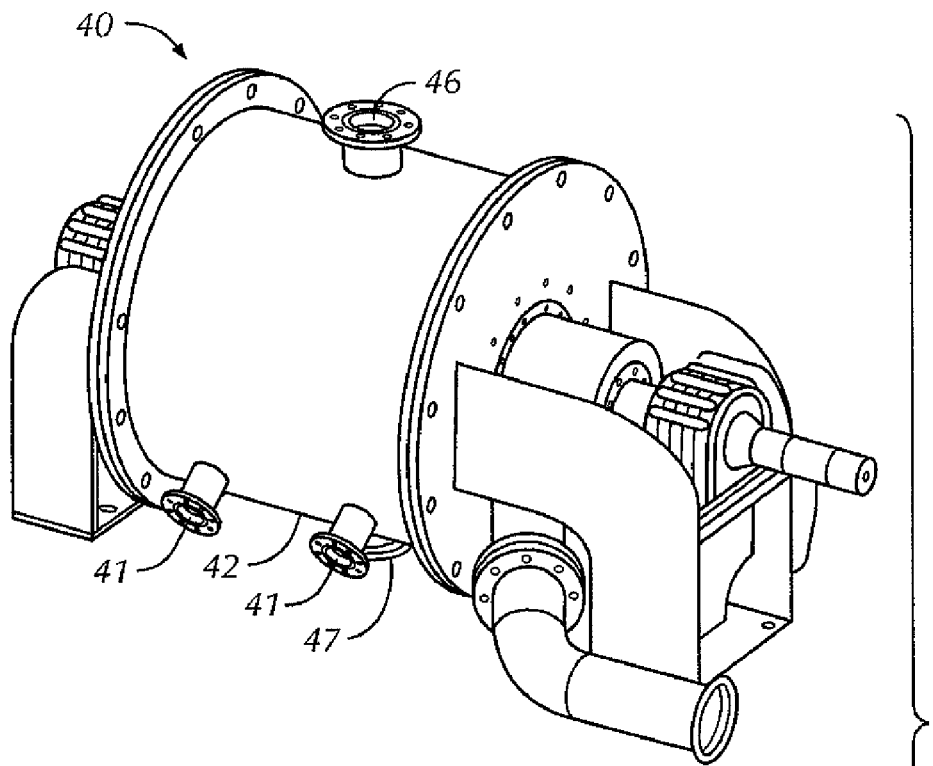
FIG. 4 is a schematic of a reactor unit according to one embodiment of the present disclosure.
Figure 4:
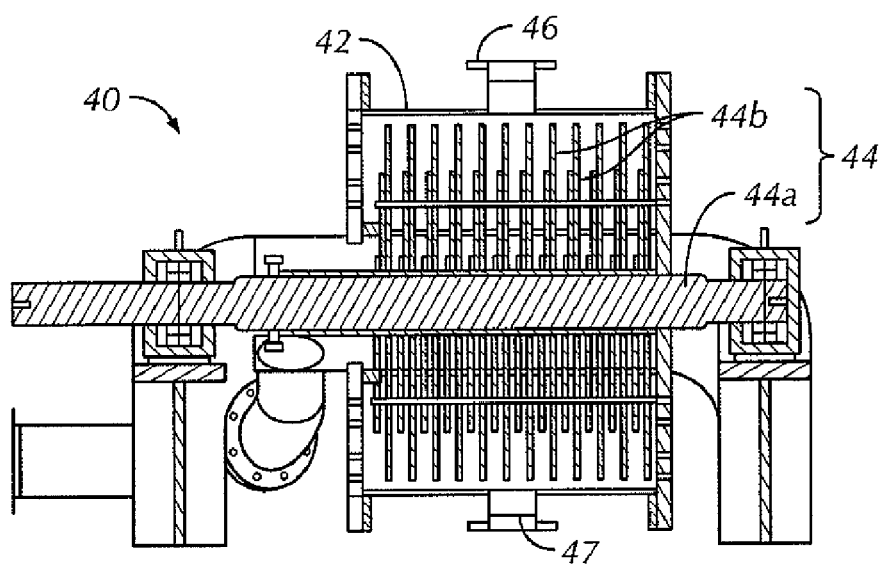

As the addition of compressed air into the pressurized vessel(s) discharges the drill cuttings therefrom, the cuttings may be conveyed through discharge pipes into a reactor unit wherein at least a portion of the contaminants adsorbed to the surface of the cuttings may be removed. Referring to FIG. 4, a reactor unit according to one embodiment of the present disclosure is shown. As shown in FIG. 4, reactor unit 40 includes a cylindrical processing chamber 42 into which drill cuttings are loaded through inlet(s) 41. While not shown in FIG. 4, one of ordinary skill in the art would recognize that inlet(s) 41 may receive drill cuttings directly from a pressurized vessel, such as those shown in FIGS. 2 and 3, or indirectly through a feed hopper, as known in the art.

Mounted in processing chamber 42 is a rotor 44. Rotor 44 includes a shaft 44a and a plurality of fixed rotor arms 44b. Rotor arms 44b extend radially from shaft 44a in axially aligned rows. Rotor 44 rotates within processing chamber 42 via a motor (not shown). As rotor 44 rotates within processing chamber 42, an annular bed of drill cuttings is formed against the inner surface of the processing chamber 42. The rotation of the arms may vary, for example, such that the tangential velocity of the ends of the rotor arms ranges from about 10 to 100 m/s, and from about 30 to 40 m/s in other embodiments. Frictional forces, and thus heat, are generated as the drill cuttings interact with the inner surfaces of the processing chamber 42. As the generated heat amounts, the contaminants adsorbed to the surface of the cuttings may be vaporized, exiting the reactor unit through vapor outlets 46. Dried drill cuttings may exit the reactor vessel through outlets 47.

In one embodiment, the cylindrical processing chamber having a diameter ranging from 0.5-5 m, and about 1 m in another embodiment. The number of rotor arms may depend on the particular size of the processing chamber, but may range, in various embodiments, from 10-100 arms per square meter of the inner wall of the processing chamber. Further, the arms may extend radially toward the inner wall of the processing chamber to a clearance of less than 0.1 m. However, one of ordinary skill in the art would recognize that the number of rotor arms, etc, may vary and depend upon the selected size of the processing chamber.

Other reactor units that may be used in combination with the pneumatic transfer system disclosed herein may include those used onshore for the treatment of contaminated drill cuttings such as, for example, the reactor unit described in U.S. Patent Publication No. 2004/0149395, which is herein incorporated by reference in its entirety. One particular example of a reactor vessel suitable for use in the present disclosure is commercially available from Thermtech (Bergen, Norway) under the trade name Thermomechanical Cuttings Cleaner (TCC). Other reactor units that may be used in conjunction with the pressurized vessels as described herein may include those described in U.S. Pat. No. 6,658,757 and WO 06/003400, which are herein incorporated by reference in their entirety.

As described in U.S. Patent Publication No. 2004/0149395, by selecting dimensions and operating parameters for the reactor unit, a sufficient amount of energy may be generated to initiate vaporization of the contaminants adsorbed to the surface of the drill cuttings. Furthermore, because of the presence of more than one contaminant having differing boiling points, the vaporization of the contaminant having a higher boiling point may occur at a temperature less than the atmospheric boiling point. That is, the presence of one component, e.g., an aqueous fluid, may provide for a partial pressure of the gas phase of a second component, e.g., oil, less than atmospheric pressure, thus reducing the boiling point of the second component. In a particular embodiment the contaminants include both an oil phase and an aqueous phase. In other embodiments, a aqueous phase may be added to the reactor, such as in the form of vapors, to reduce the partial pressure of the oil contaminants and reduce the amount of energy necessary to vaporize the oil contaminants.

Typically, drilling fluids, and thus drilling contaminants, have a water/oil ratio of at least about 1:2 by mass. Oil-based fluids used in wellbore fluids have an average molecular weight of 218 g/mol (corresponding to an average carbon chain length of $C_{16}$), whereas water has a molecular weight of 18 g/mol. With a mass ratio of at least 1:2, the volume fraction of oil vapors when all water and oil has evaporated will be 14% [($2/216$)/($1/18+2/216$)]. Such a partial pressure may allow for the boiling point reduction of approximately 50° C. for the oil portion.

Figure 5:
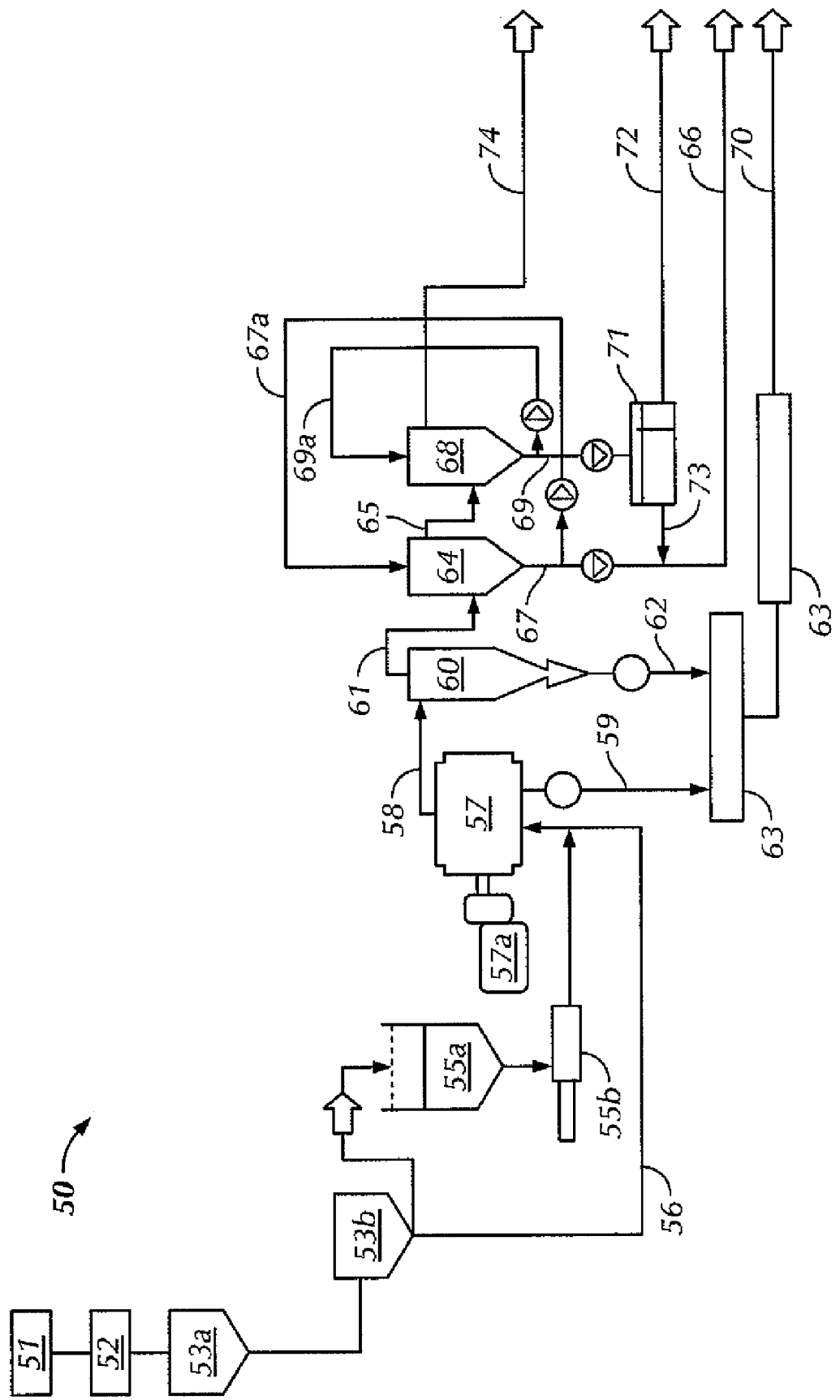
FIG. 5 is a schematic of a system according to another embodiment of the present disclosure.

Referring to FIG. 5, another embodiment of a treatment system of the present disclosure is shown. As shown in FIG. 5, drill cuttings 51 arising from the drilling process are subjected to a screening device 52, e.g., shakers. From the shakers, the screened cuttings are loaded into a feed hopper (not shown) attached to first pressurized vessel 53. From first pressurized vessel 53a, drill cuttings are conveyed into a second pressurized vessel 53b via the addition of a compressed gas (not shown). As illustrated, system 50 includes a first pressurized vessel 53a and a second pressurized vessel 53b; however, one of skill in the art would recognize that in various other embodiments, the system may include any number of pressurized vessels, such as a single pressurized vessel or more than two pressurized vessels. Addition of a compressed gas (not shown) into pressurized vessel 53b allows for the conveyance of drill cuttings out of pressurized vessel 53b and into reactor unit 57, either directly through feed line 56 or indirectly through feed hopper 55a and hydraulic feed pump 55b. However, one of ordinary skill in the art would appreciate that the transfer could occur via other means, such as, for example, through hopper 55a and rotary valve (not shown). In a particular embodiment, the drill cuttings may be conveyed from pressurized vessel 53b to reactor unit 57 at a rate of up to 40 MT/hr. However, one of skill in the art would recognize that the transfer rate may be dependent upon a number of factors, such as the material being transferred.

In reactor unit 57, a plurality of rotor arms (not shown) are caused to rotate by the drive unit 57a, generating heat. The generation of heat vaporizes at least a portion of the contaminants 58 adsorbed to the surface of the drill cuttings 59. Contaminants 58 are evacuated from the reactor vessel 57 and passed through a cyclone 60. In cyclone 60, any particulate matter 62 that is present in contaminants 58 is separated from vapors 61. Vapors 61 are then passed through an oil condenser 64 to allow for the condensation of oil vapors and separation from vapors 65, which are then fed to water condenser 68. In some embodiments, condensed oil portion 67 may be re-circulated 67a into oil condenser 64. Optionally, condensed oil portion 67 may undergo heat exchange (not shown) prior to re-circulation into the oil condenser 64. In other embodiments, condensed oil portion 67 may be directed for collection at oil recovery 66.

Vapors 65 may be directed from oil condenser 64 to water condenser 68 to allow for the condensation of water vapors and separation from non-condensable gases 74. In some embodiments, condensed water portion 69 may be re-circulated 69a into water condenser 68. Optionally, condensed water portion 69 may undergo heat exchange (not shown) prior to re-circulation into the water condenser 68. In other embodiments, condensed water portion 69 may be directed into collection tank 71. In collection tank 71, a weir arrangement may be disposed to allow for separation of any residual oil phase 73 from recovered water 72.

Dried drill cuttings 59 exit reactor unit 57 and are conveyed through a screw conveyor 63, or the like, to solids recovery 70. Any particulate matter 62 separated from vapors 61 in cyclone 60 are also fed to solids recovery 70 via screw conveyor 63. Recovered solids 70 may, in various embodiments, be subjected to disposal (e.g., cuttings re-injection) or stored for later disposal or use. Recovered water 72 and oil 66 components may find further use, such as re-circulation into drilling fluids.

Figure 6:
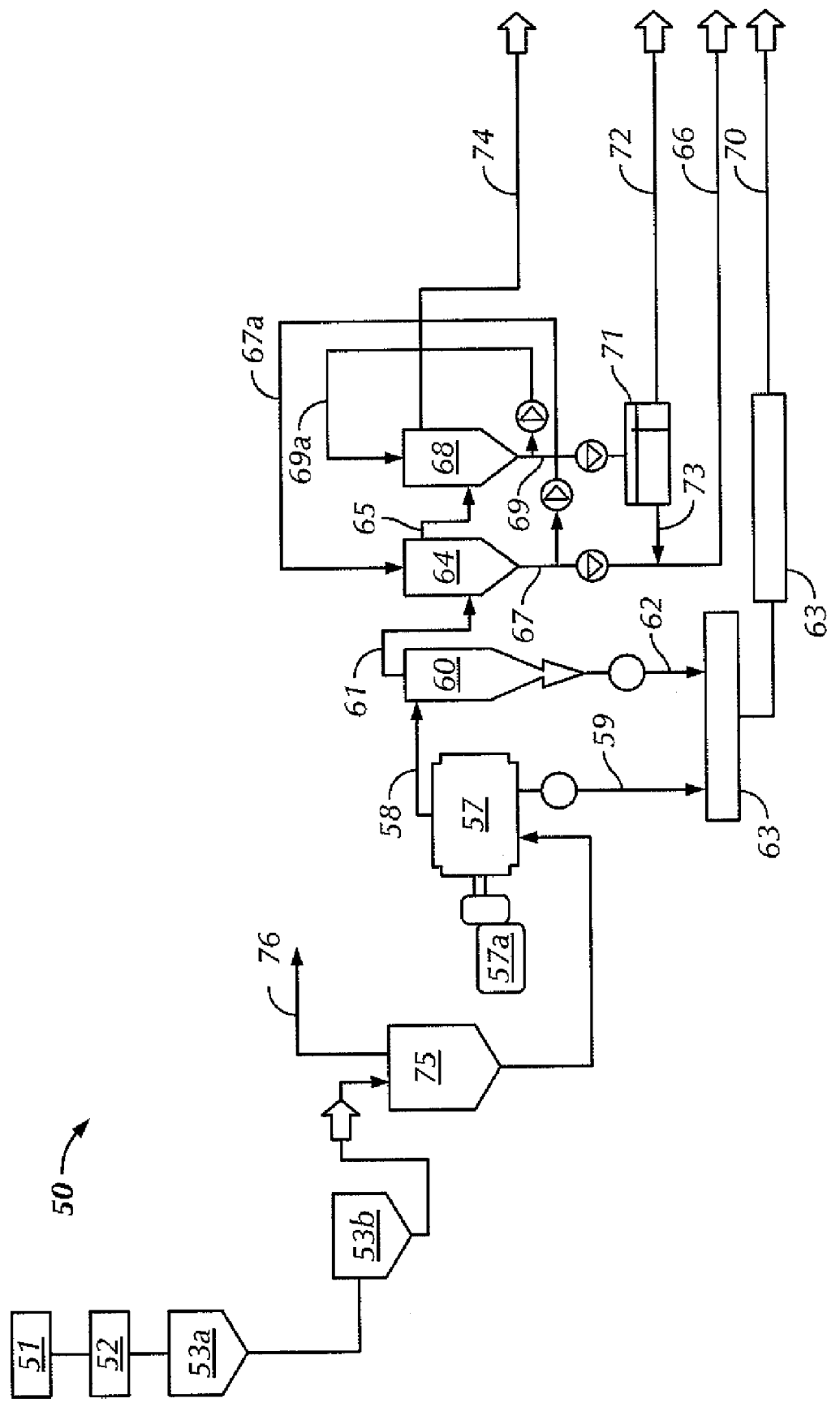
FIG. 6 is a schematic of a system according to another embodiment of the present disclosure.

Referring to FIG. 6, another embodiment of a treatment system of the present disclosure is shown. Similar to the embodiment shown in FIG. 5, drill cuttings 51 arising from the drilling process are subjected to a screening device 52, e.g., shakers. From the shakers, the screened cuttings are loaded into a feed hopper (not shown) attached to first pressurized vessel 53. From first pressurized vessel 53a, drill cuttings are conveyed into a second pressurized vessel 53b via the addition of a compressed gas (not shown). As illustrated, system 50 includes a first pressurized vessel 53a and a second pressurized vessel 53b; however, one of skill in the art would recognize that in various other embodiments, the system may include any number of pressurized vessels, such as a single pressurized vessel or more than two pressurized vessels. Addition of a compressed gas (not shown) into pressurized vessel 53b allows for the conveyance of drill cuttings out of pressurized vessel 53b and into separator 75. In separator 75, at least a portion of the liquid content 76 of the contaminated drill cuttings may be removed therefrom to increase the feed and throughput of the reactor unit 57. One of ordinary skill in the art would appreciate that liquid content 76 may be subjected to subsequent separation means to separate liquid content 76 into oil and aqueous portions if necessary. Separator 75 may include one or more of centrifuges, hydrocyclones, dryers, hydrocyclone shakers, or combinations thereof, for example. In a particular embodiment, separator 75 may include a vertical centrifuge rotary cuttings dryer, such as the VERTI-G™ cuttings dryer available from M-I LLC (Houston, Tex.). As described above, conveyances may occur directly through feed lines or indirectly through feed hoppers, hydraulic feed pumps and/or rotary valves, and the like.

Following removal of at least a portion of the liquid content from contaminated drill cuttings, contaminated drill cuttings are conveyed to reactor unit 57, for example, by the various means described above. In reactor unit 57, a plurality of rotor arms (not shown) are caused to rotate by the drive unit 57a, generating heat. The generation of heat vaporizes at least a portion of the contaminants 58 adsorbed to the surface of the drill cuttings 59. Contaminants 58 are evacuated from the reactor vessel 57 and passed through a cyclone 60. In cyclone 60, any particulate matter 62 that is present in contaminants 58 is separated from vapors 61. Vapors 61 are then passed through an oil condenser 64 to allow for the condensation of oil vapors and separation from vapors 65, which are then fed to water condenser 68. In some embodiments, condensed oil portion 67 may be re-circulated 67a into oil condenser 64. Optionally, condensed oil portion 67 may undergo heat exchange (not shown) prior to re-circulation into the oil condenser 64. In other embodiments, condensed oil portion 67 may be directed for collection at oil recovery 66.

Vapors 65 may be directed from oil condenser 64 to water condenser 68 to allow for the condensation of water vapors and separation from non-condensable gases 74. In some embodiments, condensed water portion 69 may be re-circulated 69a into water condenser 68. Optionally, condensed water portion 69 may undergo heat exchange (not shown) prior to re-circulation into the water condenser 68. In other embodiments, condensed water portion 69 may be directed into collection tank 71. In collection tank 71, a weir arrangement may be disposed to allow for separation of any residual oil phase 73 from recovered water 72.

Dried drill cuttings 59 exit reactor unit 57 and are conveyed through a screw conveyor 63, or the like, to solids recovery 70. Any particulate matter 62 separated from vapors 61 in cyclone 60 are also fed to solids recovery 70 via screw conveyor 63. Recovered solids 70 may, in various embodiments, be subjected to disposal (e.g., cuttings re-injection) or stored for later disposal or use. Recovered water 72 and oil 66 components may find further use, such as re-circulation into drilling fluids.

Advantageously, embodiments of the present disclosure provide for at least one of the following. Offshore treatment of drill cuttings may be achieved with pneumatic conveyance of the contaminated drill cuttings from the drilling process to a thermal desorption unit. Further, the pneumatic nature of the conveyance of the drill cuttings and the ability of the pressurized vessels to act as storage containers may allow for contaminated drill cuttings to be filled in the pressurized vessel over a period of time. However, whenever treatment of the cuttings is desired, compressed gas may be fed into the pressurized vessel, allowing for pneumatic conveyance of the drill cuttings to a thermal desorption unit in a relatively short period of time, without requiring the addition of any base oils or other carrier fluids to enable conveyance. Thus, efficiency in transportation and treatment of the drill cuttings may be obtained.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A system for offshore treatment of drill cuttings, comprising:
   a first pressurized vessel configured to receive contaminated drill cuttings and adapted to allow a compressed gas be introduced therein as the sole means for inducing movement of said contaminated drill cuttings in the first pressurized vessel, whereby at least a portion of the contaminated drill cuttings is discharged from the first pressurized vessel;
   a second pressurized vessel in fluid communication with the first pressurized vessel and adapted to allow a compressed gas be introduced therein as the sole means for inducing movement of said contaminated drill cuttings in the second pressurized vessel, whereby at least a portion of the contaminated drill cuttings is discharged from the second pressurized vessel by positive pressure under mass flow; and
   a reactor unit in fluid connection with the second pressurized vessel for separating the contaminated drill cuttings into drill cuttings and contaminants, comprising:
      a processing chamber having at least one inlet and outlet; and
      a rotor mounted in the processing chamber, comprising:
         a shaft; and
         a plurality of fixed rotor arms extending radially from the shaft;
   wherein the first pressurized vessel, the second pressurized vessel, and the reactor unit are on an offshore rig.

2. The system of claim 1, further comprising:
   a separator in fluid connection with the first pressurized vessel and the reactor unit configured to received the contaminated drill cuttings from the first pressurized vessel and deliver the contaminated drill cuttings to the reactor unit, wherein the separator removes at least a portion of liquid content from the contaminated drill cuttings.

3. The system of claim 1, wherein the second pressurized vessel comprises a lower angled section having an angle selected to further enable mass flow of contaminated drill cuttings.

4. The system of claim 1, wherein the first pressurized vessel receives the contaminated drill cutting from a separation means.

5. The system of claim 1, wherein the second pressurized vessel comprises a lower conical portion defining a cone angle selected to further enable mass flow of contaminated drill cuttings.

6. The system of claim 1, wherein the second pressurized vessel comprises an upper portion comprising a feed hopper.

7. The system of claim 1, wherein the first pressurized vessel comprises an upper portion comprising feed hopper.

8. The system of claim 1, wherein the processing chamber comprises a substantially smooth interior surface.

9. The system of claim 1, further comprising:
   means for separating dust particles from the contaminants.

10. The system of claim 1, wherein the contaminants comprise an oil portion and an aqueous portion.

11. The system of claim 1, further comprising:
   means for separating the contaminants into the oil portion and the aqueous portion.

12. A method for offshore treatment of drill cuttings, comprising:
   pneumatically conveying contaminated drill cuttings into a first pressurized vessel having a lower conical section structured to achieve mass flow of the contaminated drill cuttings;
   pneumatically conveying contaminated drill cuttings from the first pressurized vessel into a second pressurized vessel having a lower conical section structured to achieve mass flow of the contaminated drill cuttings;
   transferring the contaminated drill cuttings to a reactor unit by applying a compressed gas to the second pressurized vessel whereby the contaminated drill cuttings flow out of the second pressurized vessel into the reactor vessel by positive pressure under mass flow;
   applying heat to the contaminated drill cuttings so as to vaporize contaminants from the contaminated drill cuttings; and
   removing the vaporized contaminants from the reactor;
   wherein the first pressurized vessel, the second pressurized vessel, and the reactor unit are on an offshore rig.

13. The method of claim 12, wherein the reactor comprises:
   a processing chamber having at least one inlet and outlet; and
   a rotor mounted in the processing chamber, comprising:
      a shaft; and
      a plurality of fixed rotor arms extending radially from the shaft.

14. The method of claim 13, wherein applying heat comprises rotating the rotor to form an annular bed of the contaminated drill cuttings against an inner surface of the processing chamber while frictionally generating heat.

15. The method of claim 12, wherein the contaminants comprises an oil portion and an aqueous portion.

16. The method of claim 15, further comprising:
   simultaneously evaporating the oil portion with the aqueous portion at a temperature below the normal atmospheric boiling point of the oil portion.

17. The method of claim 15, further comprising:
   separating the vaporized contaminants into the oil portion and the aqueous portion.

18. The method of claim 12, further comprising:
   screening a wellbore fluid/drill cuttings mixture from an oil rig assembly to provide contaminated drill cuttings.

19. A method for offshore treatment of drill cuttings, comprising:
   pneumatically conveying contaminated drill cuttings into a first pressurized vessel having a lower conical section structured to achieve mass flow of the contaminated drill cuttings; and
   pneumatically conveying the contaminated drill cuttings from the first pressurized vessel into a second pressurized vessel having a lower conical section structured to achieve mass flow of the contaminated drill cuttings;

transferring the contaminated drill cuttings to a separator by applying a compressed gas to the second pressurized vessel whereby the contaminated drill cuttings flow out of the second pressurized vessel into the separator by positive pressure under mass flow;

removing at least a portion of liquid content from the contaminated drill cuttings;

transferring the contaminated drill cuttings from the separator to a reactor unit;

applying heat to the contaminated drill cuttings so as to vaporize contaminants from the contaminated drill cuttings; and removing the vaporized contaminants from the reactor;

wherein the first pressurized vessel, the second pressurized vessel, the separator, and the reactor unit are on an offshore rig.

* * * * *